FUEL INJECTION APPARATUS AND CONTROL MECHANISM THEREFOR

Original Filed March 28, 1951 6 Sheets-Sheet 1

INVENTOR
Carl F. High
Carlson, Pitzner, Hubbard & Wolfe
ATTORNEYS

FUEL INJECTION APPARATUS AND CONTROL MECHANISM THEREFOR

Original Filed March 28, 1951 6 Sheets-Sheet 2

INVENTOR
Carl F. High

Carlson, Pitzner, Hubbard & Wolfe
ATTORNEYS

FUEL INJECTION APPARATUS AND CONTROL MECHANISM THEREFOR

Original Filed March 28, 1951 6 Sheets-Sheet 3

INVENTOR
Carl F. High

Carlson, Pitzner, Hubbard & Wolfe
ATTORNEYS

FUEL INJECTION APPARATUS AND CONTROL MECHANISM THEREFOR

Original Filed March 28, 1951 6 Sheets-Sheet 4

INVENTOR
Carl F. High
Carlson, Pitzner, Hubbard & Wolfe
ATTORNEYS

FUEL INJECTION APPARATUS AND CONTROL MECHANISM THEREFOR

Original Filed March 28, 1951 6 Sheets-Sheet 5

INVENTOR
Carl F. High
Carlson, Pitzner, Hubbard & Wolfe
ATTORNEYS

FUEL INJECTION APPARATUS AND CONTROL MECHANISM THEREFOR

Original Filed March 28, 1951 6 Sheets-Sheet 6

INVENTOR
Carl F. High
Carlson, Pitzner, Hubbard & Wolfe
ATTORNEYS

United States Patent Office

Re. 24,132
Reissued Mar. 20, 1956

24,132

FUEL INJECTION APPARATUS AND CONTROL MECHANISM THEREFOR

Carl F. High, Detroit, Mich.

Original No. 2,667,840, dated February 2, 1954, Serial No. 218,045, March 28, 1951. Application for reissue November 22, 1954, Serial No. 470,555

29 Claims. (Cl. 103—2)

Matter enclosed in heavy brackets [ ] appears in the original patent but forms no part of this reissue specification; matter printed in italics indicates the additions made by reissue.

The present invention relates to liquid fuel injection apparatus and more particularly to a novel form of fuel pump by means of which measured charges of liquid fuel may be pumped to a plurality of internal combustion engine cylinders, or cylinder intake ports, in timed relation to the order of firing thereof. The invention also relates to a control mechanism by means of which the operation of the fuel pump may be modified to accommodate varying conditions arising in connection with the operation of the engine, as exemplified by a variation in the density or pressure of air existing in the intake manifold of the engine, occasioned by changing engine speed due to an increase or decrease in the engine load, by a variation of atmospheric pressure existing in the vicinity of the engine, or by a combination of these or other factors which govern, or are governed by the operation of the engine.

Still more specifically the invention relates to a fuel pump construction including a pumping plunger which is operable, in timed relationship with an internal combustion engine which drives the same, to pump liquid fuel and to distribute the same to the plurality of fluid outlets which may be connected by fluid conduits and atomizing spray nozzles to convey measured charges of fuel respectively to the several engine cylinders or intake ports in the order of their induction or firing and in timed relation thereto.

It is among the principal objects of the invention to provide a fuel pump construction of the character briefly outlined above in which a single pump plunger, in addition to its pumping function, also serves to distribute measured quantities of fuel to a plurality of fuel outlets for engine injection purposes and in which the quantity of fuel distributed may be varied continuously according to the variable fuel demand requirements of the engine.

An equally important object of the invention is to provide a fuel pump of this character having associated therewith means whereby the volume or amount of fuel distributed to the various outlets may be varied or regulated to an extremely fine degree without varying the stroke of the pumping plunger.

In carrying out this last mentioned object, the invention contemplates the provision of a fuel pump having a reciprocable and rotatable pumping plunger movable in one direction through its suction stroke to withdraw fuel from a supply source, and movable in the other direction through its pumping stroke to deliver the withdrawn fuel to a fluid outlet, together with means operable during reciprocation of the plunger for separately discharging or "spilling" a predetermined amount or measured quantity of the withdrawn fluid to thereby lessen and thus vary the total amount of fuel delivered to the fuel outlet.

Another object of the invention is to provide a fuel pumping apparatus of this character wherein the pumping action of the pumping plunger is employed both for forcibly discharging or "spilling" fuel through a spill port provided for the purpose, as well as for performing its regular pumping action whereby fuel is forcibly ejected through the discharge outlet.

Another object of the invention is to provide a novel type of control mechanism for a fuel pump of the character briefly outlined above, wherein means are provided for varying the amount of fuel discharged to the spill port to thereby vary the fuel delivered to the fuel outlet in accordance with the fuel demand or density requirements of the engine.

A still further object of the invention is to provide such a control mechanism together with means whereby the control mechanism may be regulated so as to vary its manner of control throughout a wide range of operation and for any desired purpose as for example, to accommodate changes in the fuel demand or density requirements of the engine arising by virtue of varying atmospheric pressure or temperature.

Yet another object of the invention is to provide a control mechanism of this sort which may be manually regulated or adjusted to accommodate the fuel requirements of a particular engine as for example, to establish proper idling adjustment of the engine when the latter is not under load.

Other objects or advantages of the invention not at this time enumerated, will become more readily apparent as the nature of the invention is better understood. In the accompanying six sheets of drawings one embodiment of the fuel injection apparatus and two embodiments of a control mechanism therefor have been illustrated.

Figure 1:
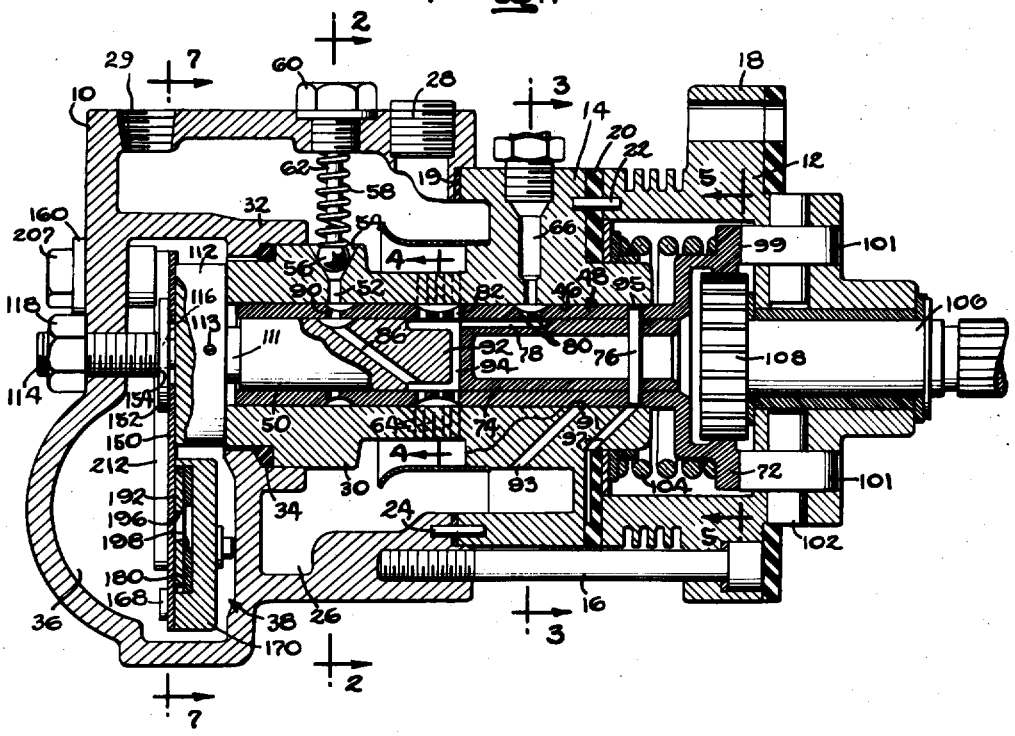
Figure 1 is a longitudinal, sectional view taken substantially centrally through an assembled fuel injection pump and diaphragm-operated control unit constructed in accordance with the principles of the present invention.

While the invention is susceptible of various modifications and alternative constructions, there is shown in the drawings and will herein be described in detail the preferred embodiments but it is to be understood that it is not thereby intended to limit the invention to the forms disclosed, but it is intended to cover all modifications and alternative constructions falling within the spirit and scope of the invention as expressed in the appended claims.

The invention, in its broadest aspect, contemplates the provision of a fuel pump construction including a single fuel pumping plunger, which is movable relative to a cooperating fuel metering valve, with a combined reciprocating and rotary motion for controlling inlet and discharge valving function in addition to its pumping function. For each distribution of fuel to a particular engine cylinder through an outlet passage provided for it, the pumping plunger performs a suction stroke in one direction to draw fuel into the pumping cylinder through a series of inlet ports. During the return or pumping stroke of the plunger, the fuel thus taken into the cylinder is selectively forced out again through an outlet passage leading to the particular engine cylinder undergoing injection.

The selective or directional control of the fuel by the pumping plunger is afforded by the provision of a series of intake ports in the pumping plunger which move into registry with a series of intake passages in the pump casing or body at the commencement of each pumping stroke to admit intake fuel to the pump cylinder and which move out of the registry with the intake passages at the end of each intake stroke. At the commencement of each pumping stroke, there is complete closure of the intake ports while at the same time a fuel distributing port provided in the pumping plunger moves into register with the particular fuel outlet passage leading to the engine cylinder undergoing fuel injection. By such an arrangement directional control or distribution of the fuel to the various engine cylinders in timed relation to the firing thereof is accomplished.

Quantitative control of the amount of fuel delivered to each outlet port, and consequently to each engine cylinder is attained by means of a series of "spill" ports provided in the pumping plunger which are adapted to successively move into register with a "spill" passage leading to a fuel chamber which receives the fuel from a supply source. The fuel enters the spill ports in the pumping plunger through a "spill" passage provided in the metering valve, and the position of the spill passage may be adjusted to register with the spill passage in the pumping plunger and by means of which communication between the spill passage and spill port may be established. When thus established, communication through one of the spill ports, in the pumping plunger, is made possible by registry of the passage in the metering plunger, the port in the pumping plunger and the spill passage in the casing or pump body.

The time and duration of registry of the spill control ports in the pumping plunger with the spill passage in the metering valve and the spill passage in the pump casing may be varied by control of the position of the metering valve. According to the present invention, the position of the metering valve is varied by means of a control mechanism which, in turn, is operable under the control of the fuel demand of the engine as exemplified by the density of air in the intake manifold of the engine as determined by the speed of the engine under load.

The control mechanism, as well as the fuel injection apparatus per se, constitutes a part of the present invention and means are provided whereby this control mechanism may be regulated to accommodate different operating conditions as for example, varying atmospheric pressure in the vicinity of the engine, varying temperature of the air in the induction system of the engine, or both. Regulation of the control mechanism to accommodate such changes in atmospheric pressure or air temperature may be effected by manual means or automatic means, or both. Provision is made for further regulation of the control means in order to establish proper feed of fuel to the engine at all times and particularly for idling purposes.

Figure 2:
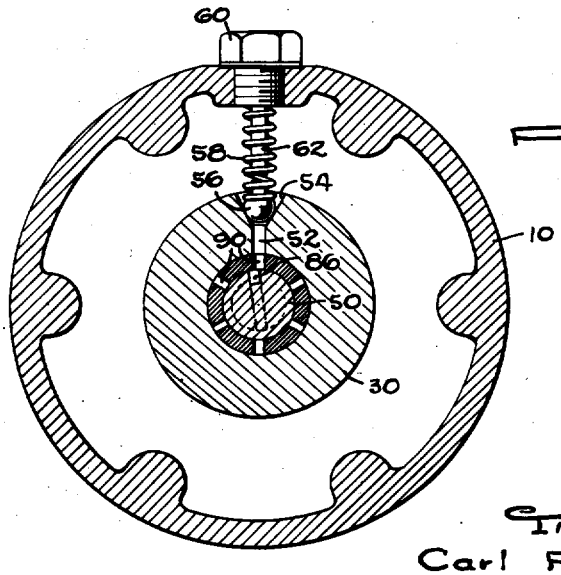
Fig. 2 is a sectional view taken substantially along the line 2—2 of Fig. 1.
Figure 3:
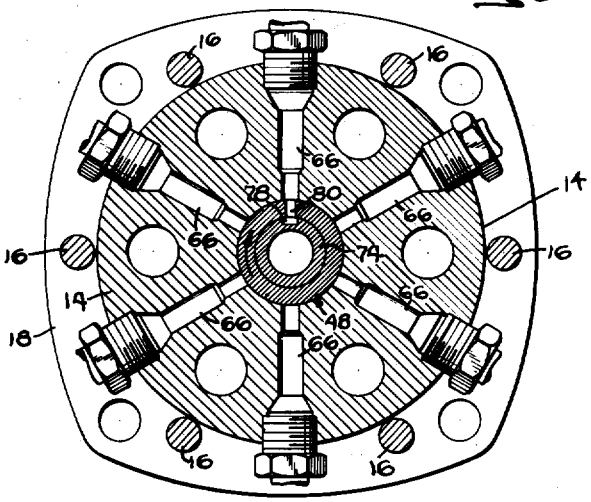
Fig. 3 is a sectional view taken substantially along the line 3—3 of Fig. 1.

Referring now to the drawings in detail and in particular to Figs. 1 and 2, the improved fuel injection apparatus comprising the present invention is particularly designed for application to an engine having six cylinders and thus the fuel pump proper is provided with an equal number of liquid fuel outlets. The fuel injector mechanism and the control device therefor are operatively assembled together in a composite housing structure including end sections 10 and 12 and an intermediate section 14, this latter section constituting the body or casing of the injection pump proper. The intermediate section or pump casing 14 is clamped between the end sections 10 and 12 by means of a series of elongated clamping bolts 16 which pass through a flange 18 formed on the end section 12 and which are threadedly received in the body of the end section. The three sections, 10, 12 and 14 are operatively secured together in sealing relationship by means of a gasket 19 disposed between the sections 10 and 14 and a gasket 20 disposed between the sections 12 and 14. A locating pin 22 serves to maintain the section 12 in its proper angular relationship with respect to the casing 14. A similar locating pin 24 maintains the proper angular relationship between the sections 10 and 14.

The end section 10 is provided with an internal annular space or chamber 26 having an inlet port 28 in communication therewith and adapted to be operatively connected to a source of fuel supply. A venting port 29 is provided in the wall of the casing section 10 for the chamber 26. The space 26 constitutes a cooling jacket for the injection pump proper as well as affording a source of fluid fuel designed for admission to the fuel pump through a series of intake passages provided for it. The pump casing 14 is provided with a cylindrical body portion 30 which projects into an annular boss-like flange 32 provided interiorly of the section 10 and a fluid seal 34 is disposed between the flange 32 and cylindrical casing portion 30. The end section 10 is provided with an offset cavity or chamber 36 in which the control instrumentalities or mechanism for the fuel injection pump proper are housed. These control instrumentalities, which will be described subsequently, have been designated in their entirety at 38. A fourth casing section 40 (Figs. 7 and 15) is bolted as at 41 to the end casing section 10, and serves alternately to enclose therein either a diaphragm type of pressure control device designated in its entirety at 42 and shown in Fig. 7 or a piston type of pressure control device designated at 44 and shown in Fig. 15.

Referring now to Fig. 1, the intermediate or pump casing, section 14, is provided with a cylindrical bore 42 constituting the fuel injection pump cylinder and in which is rotatably and slidably disposed a tubular pumping plunger 48. A metering valve 50 of generally cylindrical design is disposed within the pumping plunger 48 at the left hand end thereof as viewed in Fig. 1 and is held against axial displacement but is capable of limited rotational turning movements within the bore or cylinder 46 under the control of the mechanism 38 all in a manner that will be made clear presently.

The pump casing 30 is provided with a radial passage 52 therein which establishes communication between the pump cylinder 46 and the fuel containing jacket or chamber 26 and which is hereinafter referred to as the pump body or cylinder "spill passage." The spill passage 52 is provided with a conical valve seat 54 having associated therewith a cooperating ball valve element 56 which is spring pressed as at 58 against the seat 54 and the pressure of which on the seat may be regulated by means of an adjusting stud 60. The ball valve 58 is provided with a valve stem 62 which projects through the coil spring 58 and serves to hold the latter in its operative position whereby it may exert a degree of pressure on the ball valve 56 commensurate with the setting of the adjustment stud 60. The adjustment of the ball valve 56 serves to modify to a large extent the fuel delivery of the pump throughout the entire speed range of the engine.

Figure 4:
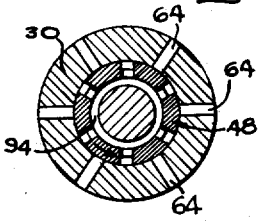
Fig. 4 is a sectional view taken substantially along the line 4—4 of Fig. 1.

A series of inlet passages 64 project through pump casing 30 in radial fashion and these passages are arranged in circumferentially spaced relation 60° apart, and in the same general transverse plane. A series of outlet or discharge passages 66 extend through the pump casing 30 and are spaced apart 60° in radial fashion and are adapted for individual connection to the various intake ports of the engine cylinders of the internal combustion engine (not shown) which is controlled by the present fuel injection apparatus. As most clearly shown in Fig. 4, the inlet passages 64 are displaced approximately 30° relative to the discharge passages 66. This angular displacement of the inlet passages 64 has been indicated in Fig. 1 by showing these passages in dotted lines.

It will be understood that the fuel injection pump of the present invention may be modified to serve internal combustion engines having different numbers of cylinders. For example, for a four-cylinder engine four inlet passages 64 and four outlet or discharge passages 66 arranged 90° apart would be employed.

Figure 6:
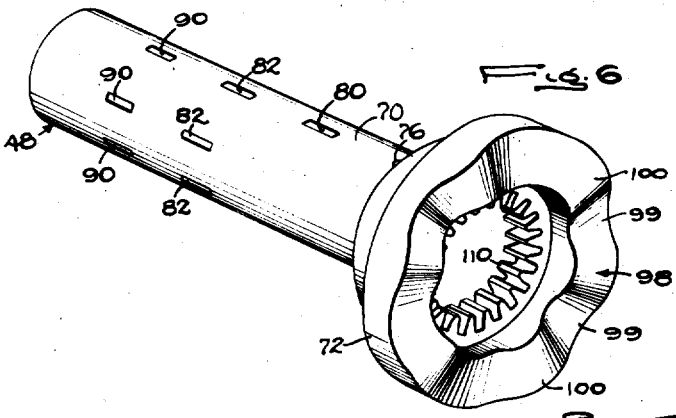
Fig. 6 is an enlarged perspective view of a pumping plunger employed in connection with the fuel pump of Fig. 1.

The pumping plunger 48 is illustrated in detail in Fig. 6 and is in the form of an open ended tubular member having a cylindrical body portion 70 and an enlarged cup-shaped flange or foot portion 72. A preferably hollow tubular closure member 74 (Fig. 1) is secured within the tubular cylindrical portion 70 of the pumping plunger 48 by means of a pin 76. The closure member 74 substantially fills the entire right hand half of the pumping plunger 48 and is provided with a circumferential axially extending groove 78 which constitutes an outlet passage and is in communication with an outlet port 80 provided in the wall of the pumping plunger 48. This port 80 is designed for successive communication with the various outlet passages 66 provided in the pump casing 30 upon rotation and reciprocation of the pumping plunger 48.

An inclined passage 86 extends through the metering valve 50 and is hereinafter referred to as the metering valve spill passage. The spill passage 86 is capable of being moved into varying degrees of partial alignment with the spill passage 52 provided in the pump casing 30 upon angular adjustment of the metering valve 50 under the control of the mechanism 38 contained within the space or chamber 36 provided in the end casing section 10.

The metering valve spill passage 86 is capable of complete alignment with the passage 52 or of any degree of alignment with this passage to a point of complete close-off wherein the two passages 86 and 52 are out of communication. A plurality of spill ports 90, of which there are six in number, arranged 60° apart, are provided in the wall of the pumping plunger 48 and are capable of simultaneous registry with the passages 52 and 86 when these latter passages are in full or partial alinement to permit fuel to be spilled through these passages at predetermined times in the machine cycle, all in a manner that will be made clear presently.

The metering valve 50 is provided with a reduced forward end 92 which is opposed to the end of the closure member 74 and the space existing within the bore of the pumping plunger 48 between the end of the metering valve 50 and of the closure member 74 constitutes the suction and discharge chamber 94 of the fuel injection pump. The chamber 94 is in constant communication with the groove 78 and consequently with the port 80 which directs fuel to the various discharge passages 66 during the discharge stroke of the pumping plunger 48.

A fuel leakage pick-up groove 91 may be provided in the pumping plunger and is designed for continuous register with a return duct 93 leading to the chamber or space 26. Similarly, a lubrication groove 95 in the plunger may receive lubricant from a passage 97 leading to the oil gallery of the engine.

Figure 5:
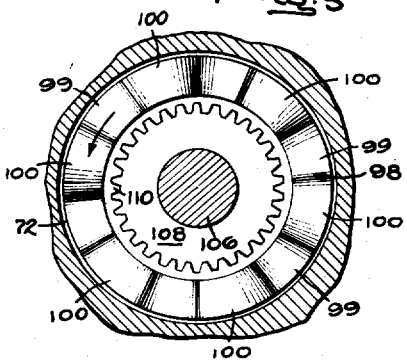
Fig. 5 is a sectional view taken substantially along the line 5—5 of Fig. 1.

In order to effect rotary and reciprocal movements of the pumping plunger 48 in timed relation to the internal combustion engine machine cycle, the foot portion 72 of the pumping plunger is provided with an end cam surface 98 having a series of six trough portions 99 and a series of intervening land or ridge portions 100, thus presenting a wavy cam surface as clearly illustrated in Figs. 5 and 6. The cam surface 98 thus provided on the foot portion 72 of the pumping plunger 48 is designed for engagement with a pair of cam rollers 101 which are carried on pins 102 mounted within the casing section 12. The rollers 101, although rotatable, are unyieldable and these rollers constitute, in effect, an unyielding cam guide support against which the cam surface 98 including the trough portions 99 and land portions 100 of the pumping plunger 48 are adapted to bear. A coil spring 104 surrounds the pumping plunger 48 and bears at one end against the foot portion 72 and at the other end against the casing section 14 and serves to normally urge the pumping plunger 48 to a retracted position wherein the cam surface 98 of the pumping plunger 48 is designed for engagement with a pair of cam rollers 101 which are carried on pins 102 mounted within the casing section 12. The rollers 101, although rotatable, are unyieldable and these rollers constitute, in effect, an unyielding cam guide support against which the cam surface 98 including the trough portions 99 and land portions 100 of the pumping plunger 48 are adapted to bear. A coil spring 104 surrounds the pumping plunger 48 and bears at one end against the foot portion 72 and at the other end against the casing section 14 and serves to normally urge the pumping plunger 48 to a retracted position wherein the cam surface 98 of the pumping plunger 48 bears against the cam rollers 101.

The pumping plunger 48 (Fig. 1) is adapted to be connected in operative driven relationshp to the engine shaft of the internal combustion engine served by the injection pump of the present invention and toward this end a shaft 106, which may be the cam shaft of an internal combustion engine, or which may operatively be connected thereto, projects into the casing section 12 and carries at its inner end a driving gear 108 which is splined as at 110 to the enlarged foot portion 72 of the pumping plunger 48. The pumping plunger 48 is thus operatively connected to the shaft 106 in driving relationship while at the same time, by virtue of the splines 110, the plunger is capable of limited axial reciprocal movement within the pump cylinder 48 under the control of the cam rollers 101 and the cam surface 98 provided on the foot portion 72 of the pumping plunger.

Where a four-cycle, six-cylinder internal combustion engine is operated under the control of the present fuel injection pump, the driving ratio between the shaft 106 and the engine crank shaft will be one complete revolution of the shaft 106 for each two revolutions of the engine crank shaft or, in other words, the shaft 106 will be driven at one-half engine crank shaft speed. In this manner the discharge port 80 in the pumping plunger 48 will move into register with one of the six discharge passages 66 leading to one of the engine cylinders at the proper moment for injection purposes.

Referring now to Fig. 1 each inlet port 82 and the single outlet port 80 provided in the wall of the pumping plunger 48 may consist of a plurality of composite, closely spaced passages, each of which communicates with a segmental crescent-shaped groove provided in the cylindrical surface of the pump body. Each outlet port 80 may similarly consist of a pair of closely spaced passages in common communication with a crescent-shaped groove provided in the outer surface of the pumping plunger. The spill ports 90 may each consist of a single radially extending passage in communication with a crescent-shaped groove on the surface of the plunger 48. The inlet passages 64 provided in the body portion of the intermediate section or pump casing 14 may consist of a series of closely spaced radial passages, the determining factor being sufficient total passage area to assure complete filling of the pump displacement at the highest engine speed. The spill ports 90 in the pumping plunger 48 each preferably consists of a single radial passage in communication with a crescent-shaped groove on the surface of the plunger. However, the determining factor will be the restricting effect desired to obtain the inclination or declination of the fuel delivery curve as plotted against the variable speed of the engine.

The various ports 82 and 80 may, if desired, consist of single radial passages, with or without the provision of the communicating grooves, but in the preferred embodiment of the invention, the plural passages and the grooves in communication therewith are employed in order to obtain sufficient unrestricted fuel flow for the capacity of the pump.

The metering valve 50 is adapted to fit snugly within the axial bore of the pumping plunger 48 and is formed with a reduced end portion 111 on which there is mounted a locating and adjusting collar 112 which is secured to the end portion 111 by means of a set screw 113. One side of the collar 112 bears against the end of the casing section 14 to prevent axial movement of the metering valve 50 in one direction. Axial movement of the metering valve in the opposite direction is prevented by means of a locating screw or bolt 114 which is threadedly received in the wall of casing section 10 and which has a reduced end 116 bearing against a face of the collar 112. A locking nut 118 serves to retain the adjusting screw 114 in any desired position of adjustment. In the assembly of the metering valve 50 the locating bolt 114 is brought into engagement with the face of the collar 112 so that the collar is held against axial displacement without binding in order to permit limited turning movement of the collar and valve about their common longitudinal axis. An eccentric pin 120 (Figs. 7, 11 and 12) extends outwardly from the face of the collar 112 and receives thereover one end of an operating link 122 associated with the control mechanism 38 provided in the offset cavity or chamber 36 of the casing section 10. The operating link 122 is adapted to be moved under the control of the instrumentalities 38 which, in turn, operate under the control of the density of air in the intake manifold of the internal combustion engine in a manner that will be made clear presently.

Figure 13:
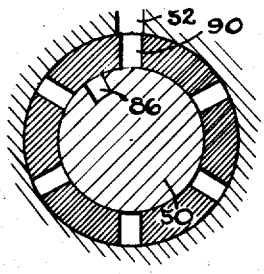
Figs. 13 and 14 are schematic views illustrating the principles involved in connection with the discharge of fuel through a spill port employed in connection with the fuel injection apparatus.
Figure 14:
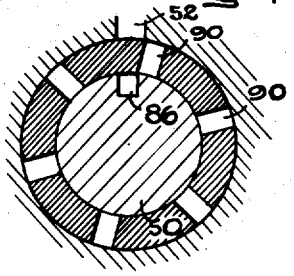
Figure 19:
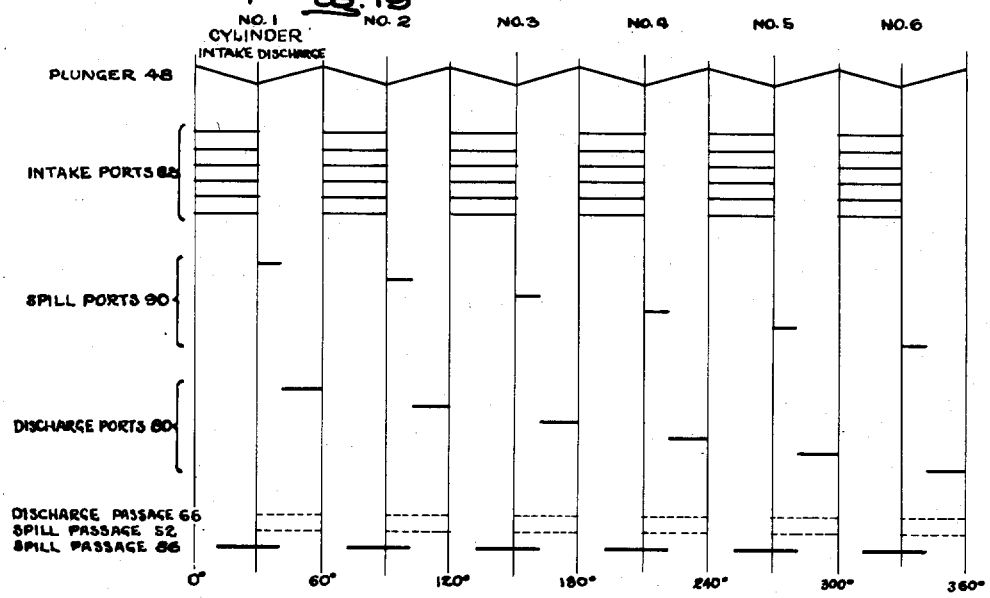
Fig. 19 is a timing diagram or chart showing the operation of the pump throughout one complete cycle of operation thereof and involving distribution of fuel to each of the cylinders of a six cylinder internal combustion engine.
Figure 20:
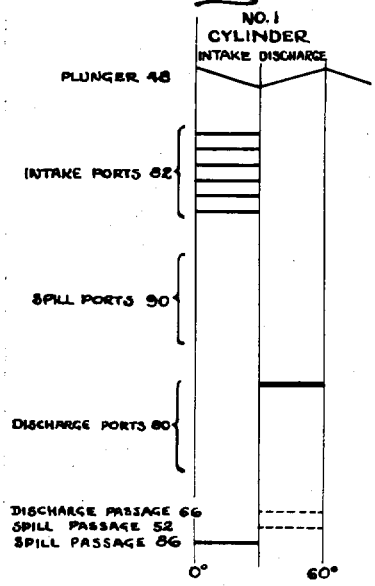
Fig. 20 is a timing diagram or chart similar to Fig. 19 illustrating the operation of the fuel injection pump for complete fuel delivery.
Figure 21:
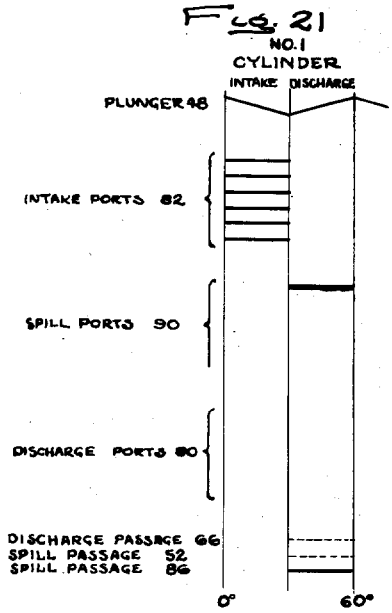
Fig. 21 is a timing diagram or chart similar to Fig. 20 illustrating the operation of the pump for full fuel cut off.

An understanding of the operation of the fuel injection pump, exclusive of the control mechanism 38, may be had by reference to Figs. 13 and 14 and to the timing charts of Figs. 19 to 21 inclusive. In the timing charts of Fig. 19 a complete cycle of pumping operation wherein the pumping plunger 48 rotates throughout one complete revolution of 360° has been diagrammatically illustrated. Such revolution of the pumping plunger 48 involves six complete reciprocating movements thereof and the discharge of a measured amount of fuel successively to each of the discharge passages 66 leading to the various engine cylinders. Only one engine cylinder cycle involving the feeding of a single engine cylinder need be considered for an understanding of the pump operation.

The operation of the pump in feeding a single engine cylinder involves one complete reciprocation of the plunger and 60° of rotation thereof.

The successive operations for the six engine cylinders have been labeled 1 to 6 inclusive across the chart.

For purposes of illustration it may be assumed that the angular setting of the metering valve 50 is such that the fuel demand of the engine is for 75% delivery of fuel from the chamber 94 through the passages 66, necessitating a 25% "spill" through the passage 52. The metering valve 50 will as a consequence be automatically positioned under the control of the instrumentalities 38 so that the required amount of spill and of discharge will take place.

Upon movement of the pumping plunger 48 to the right as viewed in Fig. 1 at the commencement of the cycle, fuel is drawn into the suction and discharge chamber 94 through all of the intake passages 64 and ports 82 simultaneously. The circumferential extent of the ports 82 and passages 64 are so designed according to engineering exigencies that each port 82 remains in at least partial registry with a passage 64 during substantially the entire intake stroke of the plunger, at which time the latter rotates through an angle of 30°. Thus, if the circular extent of each intake passage on the inside circumference of the cylindrical bore 46 represents a 14° span, and the circular extent of the intake ports 82 is also 14°, then the leading edge of each plunger port will have moved into full registry at 14° and the trailing edge will move out of registry at 28°, leaving 2° for seal, at the beginning of discharge stroke, for the total of the 30° at which time the plunger 48 has completed its full suction stroke; the suction and discharge chamber 94 is at its maximum volume and the chamber is filled with fuel which has simultaneously been drawn into the same through all of the ports 82 and passages 64.

During the intake stroke of the pumping plunger 48 in the first 60° of the engine cycle, the discharge port 80 will be out of register with the discharge passages 66 in the pump body or casing. At the same time the spill ports 90 are out of register with the spill passages 86 and 52. Thus there will be no spill of fuel at any time during the intake stroke of the pumping plunger. At the end of the suction stroke and commencement of the pumping stroke of the pumping plunger, the discharge port 80 comes into register with the discharge passage 66 while one of the spill ports 90 comes into register with the spill passage 52 due to continued rotation of the pumping plunger and thereafter the degree of registry between the port 90 and passage 52 progressively increases. Depending upon the particular angular setting of the metering valve 50, the spill passage 86 in the valve may occupy a position wherein movement of the passage 90 into registry with the passage 52 will cause the passages 86 and 52 to be bridged by the passage 90 and thus the degree of spill which will take place during this portion of the engine cycle will depend entirely upon the setting of the metering valve 50 and the relation of the passage 86 to the passage 52. Assuming that the spill passage 86 in the metering valve 50 overlaps the spill passage 52 in the casing section 14 by 7½° at the commencement of the discharge stroke when the spill port 90 is well in registry with the spill passage 86, the actual spill portion of the cycle takes place and continues to exist until such time as the trailing edge of the port 90 leaves the trailing edge of the passage 86. At this point the spill passage 86 in the metering valve 50 is completely cut off by the port 90 in the pumping plunger 48 and fuel remaining in the suction and discharge chamber 94 is then forced through the groove 78, discharge port 80 and discharge passage 66 leading to the No. 1 cylinder of the engine. Since 7½° has been consumed for the spill operation, the remaining 22½° is applied to the discharge of fuel through the passage 66. It will be understood, of course, that at 30° in the cycle, the pumping plunger 48 will have been rotated to a point where the trailing edges of each of the intake ports 82 will have moved out of registry with the respective intake passages 64, thus sealing these passages against return of fuel to the space 26 so that the only outlet remaining for the chamber 94 is through the groove 78, port 80 and passage 66.

During that portion of the cycle extending from 60° to 90° wherein fuel is applied to the No. 2 cylinder, all of the intake ports 82 again move into registry with the intake passages 64 and remain in registry therewith while the pumping plunger 48 performs its suction stroke. Following the end of the suction stroke of the plunger 48 and the beginning of its discharge stroke, the leading edge of the next adjacent spill port 90 (i. e. the spill port for the No. 2 cylinder of the engine) moves into registry with the spill passage 52 and the cycle of events set forth in connection with the No. 1 cylinder of the engine is repeated. The repetitious operations, each involving a different spill port, are repeated throughout the 360° pump cycle until such time as fuel injection to each of the six engine cylinders has taken place at which time a second pump cycle will commence.

In the time chart of Fig. 19 the heavy lines represent actual fluid flow through the designated pump ports or passages, as the case may be. The dotted lines represent relative port and passage positions. Thus during the first one-sixth cycle, the single discharge port 80 in the pumping plunger 48 (see also Fig. 1) is available for fuel discharge through the No. 1 passage 66; during the second one-sixth cycle the single discharge port 80 is available for discharge through the No. 2 passage 66, etc. The single spill passage 52 in the casing section 10 is always available and is brought into registry with the successive spill ports 90 at the commencement of each discharge stroke of the plunger 48, i. e. at 30°, 90°, 150°, etc. The successive discharge passages 66 in the casing section 14 labeled 1, 2, 3, etc. are likewise available at 30°, 90°, 150°, etc. for registry with the single discharge port 80. For 7½° spill and 22½° discharge, the spill passage 86 is shown in full lines as being offset from the fixed spill passage 52 so that the trailing edge of the No. 1 spill port 90 will remain in registry with the passage 86 for 7½° during the discharge stroke of the plunger 48 and will move out of registry with the trailing edge of the passage 86 at 37½°, thus sealing the passage against further spill and marking the commencement of the actual discharge of fuel through the discharge port 80. This operation is repeated at 97½° in the cycle and involves the next succeeding or No. 2 spill port 90.

In the timing chart of Fig. 20, only the first one-sixth of the pump cycle has been shown and in this instance, the spill passage 86 is completely out of register with the spill passage 52. Although the successive spill ports 90 communicate with the spill passage 52 for the entire discharge stroke, no spill of fuel through the passage 52 will occur inasmuch as the spill passage 86, in the metering valve 50, has been bypassed by port 90 and is thus out of registry therewith. In other words, at the time of the discharge stroke of the plunger 48, the trailing edge of each spill port 90 will have moved out of register with the spill passage 86. In such an instance, since there is no spill of fuel, 100% or maximum delivery of fuel through the discharge port 66 will take place.

In Fig. 21, the spill passage 86 is shown as being in full registry with the spill passage 52 and in such an instance, spill of fuel will take place during the entire discharge or pumping stroke of the pumping plunger 48. The leading edge of each spill port 90 will move into register through the discharge or pumping stroke of plunger 48. With the metering valve positioned for full spill, when the pumping stroke actually commences, complete register of the spill passage 86 with the spill port 90 and with the spill passages 52 will be in effect and registry thereof will remain in effect throughout the entire pumping stroke of the piston so that fuel entrapped within the suction and discharge chamber 94 will be discharged through the spill passage 52 and not through the discharge passage 66.

Figure 7:
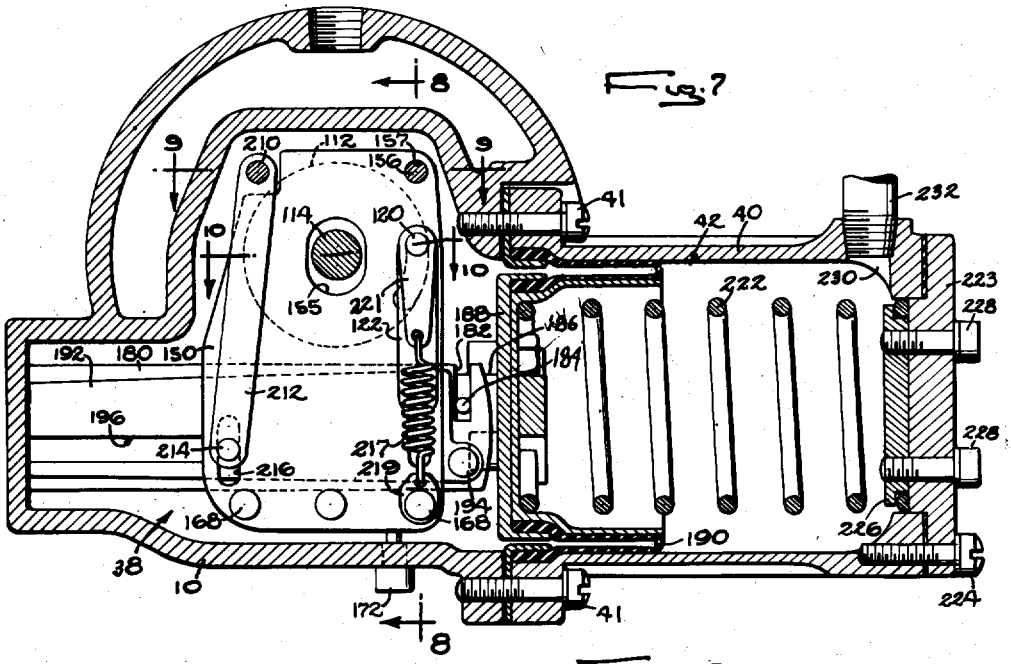
Fig. 7 is a sectional view taken substantially along the line 7—7 of Fig. 1.
Figure 8:
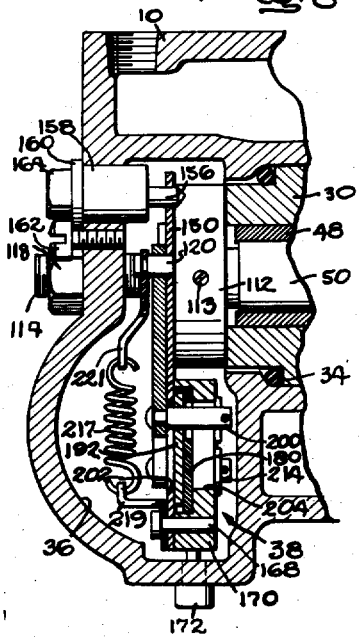
Fig. 8 is a sectional view taken substantially along the line 8—8 of Fig. 7.

As previously stated, the angular position of the metering valve 50 is adapted to be varied under the control of the density of air existing in the intake manifold of the internal combustion engine in order that the position of partial registry between the spill passage 86 in the metering valve 50 and the fixed spill passage 52 in the casing section 10 may be varied accordingly. The control mechanism 38 by means of which the angular position of the metering valve 50 may be varied is best illustrated in Figs. 1, 7 to 12 inclusive, 15 and 16. In Fig. 7 the control mechanism 38 is shown as being, in turn, controlled under the influence of the diaphragm assembly 42 disposed within the housing 40 while in Fig. 15, a piston assembly 44, likewise enclosed within the housing 40 has been substituted for the diaphragm assembly 42 of Fig. 7.

The cam assembly 38, whether diaphragm operated or piston operated, remains in substantially the same form. This cam assembly is enclosed within the space 36 provided in the casing section 10 and includes an adjustable supporting plate 150 which is held in proper position against lateral shifting within the space 36 by means of a clamping washer 152 which loosely bears against the plate on one side thereof and which on the other side bears against a shoulder 154 provided on the adjusting screw 114. A clearance slot 155 (Figs. 7 and 15) is provided in the plate 150 to accommodate the reduced end 116 of the adjusting screw 114.

Figure 15:
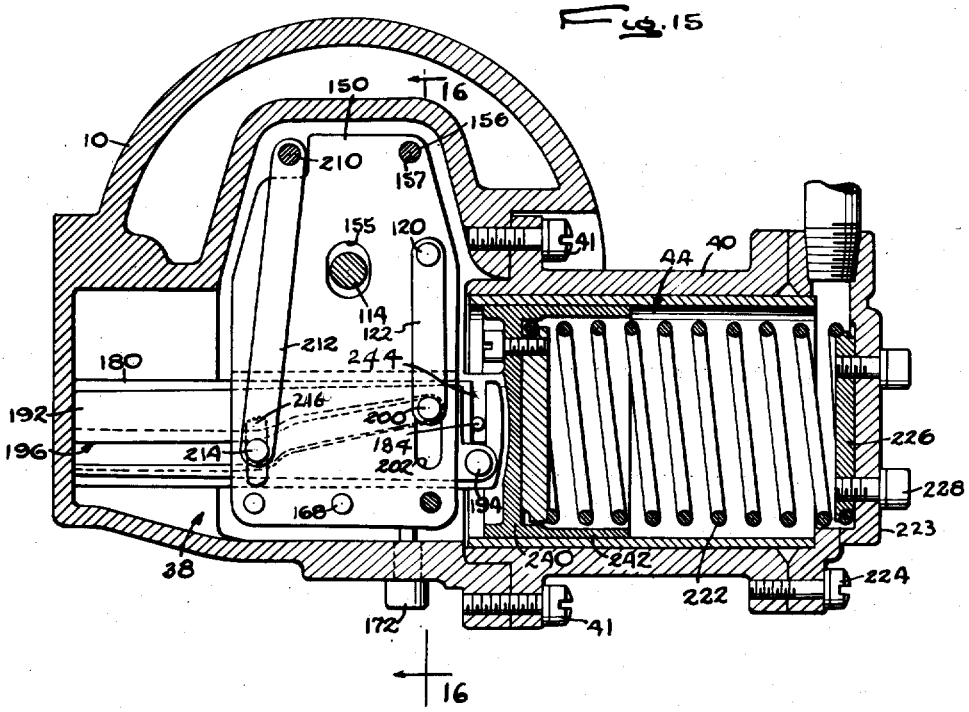
Fig. 15 is a sectional view similar to Fig. 7 showing a piston-operated control unit for the fuel injection pump illustrated in Fig. 1.
Figure 16:
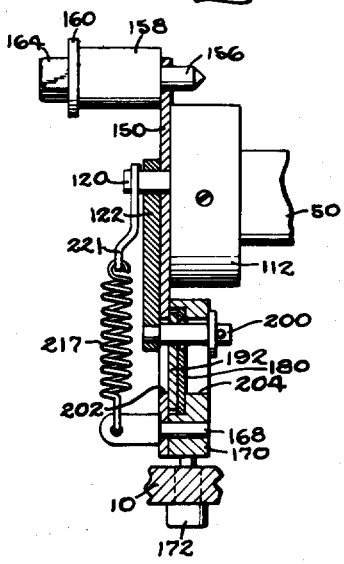
Fig. 16 is a sectional view taken substantially along the line 16—16 of Fig. 15.

The supporting plate 150 is provided with an opening 157 in the upper right hand corner thereof as viewed in Figs. 7 and 15 and an adjusting pin 156 projects through the opening for the purpose of adjusting the elevation of the plate. The adjusting pin 156 is eccentrically disposed on the end face of an adjusting shaft 158 rotatably mounted in the wall of the casing section 10 (Figs. 8, 9 and 10) and is held in position by means of retaining collar 160 secured by means of an anchoring screw 162 to the casing section 10. The outer end of the adjusting shaft 158 may be squared as at 164 for reception thereof of a suitable operating lever 166 by means of which the angular position of the shaft 158 may be varied or regulated. The lower end of the supporting plate 150 has secured thereto by means of rivets 168 an elongated guide channel or bracket 170. A guide post 172 (Fig. 7) secured in the bottom wall of the casing section 10 has one end thereof projecting upwardly within the space 36 and extending into a guide hole 174 provided in the guide channel or bracket 170. From the above description it will be seen that by turning the adjusting shaft 158 in one direction or the other, the elevation of the supporting channel 170 may be varied within limits. The lever 166 may be manually controlled or it may be automatically controlled under the influence of a pressure responsive device or a temperature responsive device or a combination of the two to accommodate the varying fuel supply demands of the internal combustion engine at different atmospheric pressures or temperatures.

Figure 17:
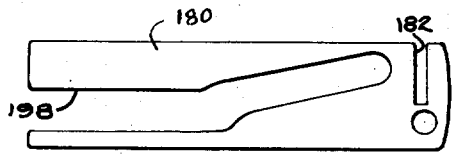
Fig. 17 is a plan side elevational view of a guide plate employed in connection with the present invention.
Figure 18:
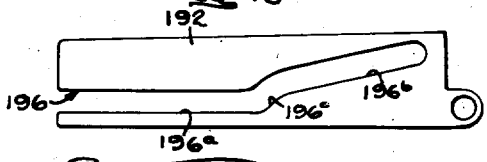
Fig. 18 is a plan view, similar to Fig. 17, showing a cam plate employed in connection with the invention.

Referring now to Figs. 7 to 10 inclusive, a laterally shiftable cam guide plate 180 (see also Fig. 17) of elongated generally rectangular design is slidably disposed within the channel shaped guide member 170. The guide plate 180 is provided with a slot 182 at one end thereof in which there is loosely received a transverse pin 184 carried on a hub 186 provided on a cup-shaped plate 188 centrally mounted on a flexible diaphragm 190, the peripheral regions of which are clamped by means of the clamping bolts 41 between the end faces of casing sections 10 and 40 as clearly shown in Fig. 7. The guide plate 180 is thus shiftable laterally within the guide bracket 170 under the influence of the diaphragm 190. A cam plate 192 (see also Fig. 18) has one end thereof pivotally secured as at 194 to the guide plate 180 in the vicinity of the slot 182 and this latter cam plate 192 occupies a position in close proximity to or in face-to-face contact with the plate 180 and is substantially co-extensive therewith. The cam plate 192 is formed with an elongated cam slot 196 therein and a registering clearance slot 198 of somewhat greater width than the cam slot 196 is provided in the plate 180.

The operating link 122 carries at its lower end a laterally projecting cam follower pin 200 (Fig. 8) which projects through the slots 196 and 198 provided in the plates 192 and 180 respectively, and which also projects through a vertically disposed slot 202 provided in the supporting plate 150 as well as through a slot 204 provided in the face of the guide channel 170. The cam slot 196 in the cam plate 192 is accurately formed so as to have a generally horizontal linear extent 196a and a generally upwardly sloping extent 196b.

An adjusting shaft 206 (Figs. 9 and 12) is rotatably mounted in the wall of the causing section 10 and is provided with a squared end 207 to which there is secured an operating lever 208. The shaft 206 carries at its inner end an eccentric pin 210 which passes through the upper end of an adjusting link 212. The lower end of the adjusting link 212 is provided with a laterally extending pin 214 which projects through the slot 196 in the horizontal regions 196a thereof. The pin 214 also projects through a slot 216 (Fig. 7) provided in the supporting plate 150. The pin 214 serves as a guide member for controlling the angular position of cam plate 192 when the latter, together with the guide plate 180, is shifted bodily as a unit. Since the guide pin 214 extends through the generally horizontal portion 196a of the slot 196, substantially no tilting movement will be applied to the cam plate 192 as the guide plate 180 is moved in either direction under the influence of the transverse pin 184.

A coil spring 217 (Figs. 7 and 8) has its lower end secured to a lug 219 which is held in position by one of the rivets 168 which clamps the guide channel 170 and guide plate 180 together and the other end of the spring is attached to spring clip 221 carried on the eccentric pin 120. The coil spring serves to take up any slack existing between the cam plate assembly and the operating link 122.

From the above description it will be seen that upon lateral shifting movement of the guide plate 180 and cam plate 192 bodily in one direction or the other, the cam follower pin 200 will ride in the cam slot 196 and, because of the fact that the guide pin 214 maintains the cam plate 192 in its same general position of angularity, the position of elevation of the cam follower pin 200 will be shifted upwardly or downwardly under the camming influence of the edges of the inclined position 196b of the cam slot 196. Upward movement of the cam follower pin 200 will serve to apply torque through the medium of the operating link 122 and eccentric pin 120 to the collar 112 of the metering valve 50, thus imparting to the collar 112 and metering valve 50 counterclockwise increments of rotation. Similarly, downward movement of the cam follower pin 200 will impart clockwise increments of rotation to the collar 112 and metering valve 50.

A consideration of the variable metering and distribution of fuel to the various discharge passages 66 leading to the different engine cylinders as determined by the position of the metering valve 50 may be had by reference to Figs. 1, 12, 13 and 14 when taken in connection with the timing charts of Figs. 19, 20 and 21. When the angularity of the metering valve 50 is such that the spill passage 86 formed therein is in complete register with the spill passage 52 provided in the casing section 10, 100% spill of fuel takes place through these passages during the discharge stroke of the pumping plunger 48 so that there is no discharge whatsoever to fuel through any of the discharge passages 66.

In Fig. 14 the two spill passages 86 and 52 are shown in complete register. This condition is represented in the timing chart of Fig. 21. As each of the spill ports 90 approaches a position of register with the spill passage 86 during the suction stroke of the pumping plunger 48, no spill of fuel will take place since the spill passage 90 is out of registry with the spill passage 52. At the beginning of the discharge stroke the port 90 moves into register with the passage 52 and spill of fuel commences and will continue until such time as the edge of the passage 86 is cut off by the trailing edge of the spill port 90. The leading edge of the spill port 90 moves into register with the spill passage 86 prior to the completion of the intake stroke of the pumping plunger but since the leading edge of the spill port 90 does not yet register with the spill passages 52 in the pump body, such communication between the spill passage 86 and the spill port 90 has no function and no fuel spill through these passages will take place. At 30° in the pump cycle when the No. 1 spill port 90 moves into register with the spill passage 52 at the beginning of the discharge stroke of the plunger 48, actual spill of fuel through the passage 86, port 90 and passage 52 takes place. This spill of fuel is continued throughout the entire discharge stroke of the pumping plunger. The same cycle of events will take place for each of the remaining engine cylinders throughout the balance of the 360° pump cycle.

The above description refers to the extreme case where a complete shut-off of fuel to the engine is effected. For full throttle position of the metering valve 50 where maximum fuel supply to the engine is effected, the metering valve 50 will be rotated in a counterclockwise direction as viewed in Fig. 12 to a point shown in the timing chart of Fig. 20 wherein the spill passage 86 in the metering valve 50 is completely out of register with the spill port 90 while the spill port 90 is in registry with the spill passage 52. This condition is also shown in Fig. 13 where the passage 86 has been cut off by the plunger port 90 before this port comes into registry with the passage 52. As the No. 1 spill port 90 in the pumping plunger 48 approaches its position of complete registry with the spill passage 52 during the discharge stroke of the pumping plunger, the port 90 will actually overlap and connect the two passages 86 and 52. However, even when the discharge stroke is in effect, no fuel will flow or spill from the passage 52, at the beginning of the discharge stroke of the plunger 48, the trailing edge of the passage 90 will have moved out of register with the spill port 86. Thus, no spill of fuel will take place during the discharge stroke and all fuel entrapped within the suction or discharge chamber 94 will be applied to the No. 1 discharge passage 66 through the discharge port 80 which moves into register with this discharge passage 66 at the commencement of the discharge stroke and which remains in register therewith throughout the entire discharge stroke. When the metering valve passage 86 is cut off by plunger port 90, before the beginning of the discharge stroke, this position of the metering valve 50 is termed herein as full throttle displacement position of the plunger. The same full displacement discharge through passage 66 can be effected by forcibly holding ball valve 56 in the conical valve seat 54. This prevents all spill irrespective of the relative position of the passage 86 in the valve 50, and the port 90 in the pumping plunger 48.

Figure 12:
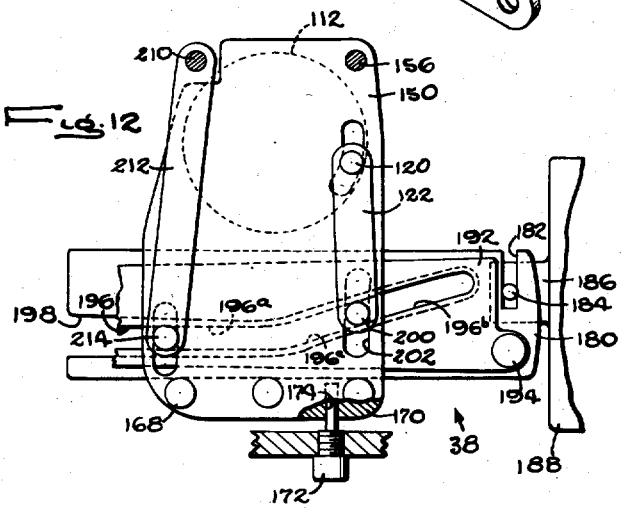
Fig. 12 is a fragmentary side elevational view of the cam and linkage mechanism shown in Fig. 1.

Referring now to Fig. 12, it will be seen that in the first extreme condition of complete fuel shut-off to the engine as outlined above, the cam follower pin 200 will be in its lowermost position so that the collar 112 on the metering valve 50 will assume its extreme clockwise limiting position. The cam assembly, including the guide plate 180 and cam plate 192, will have been moved to its extreme right hand position so that the cam follower pin 200 will be contained within the horizontal portion 196a of the slot 196.

In the other extreme condition wherein maximum supply of fuel to the engine is attained, the metering valve 50 will assume its limit of counterclockwise motion and the cam follower pin 200 will occupy a position in the upper end of the inclined portion 196b of the cam slot 196 and, as a consequence, the cam assembly 18c and 192 will occupy its extreme left hand position.

Figure 9:
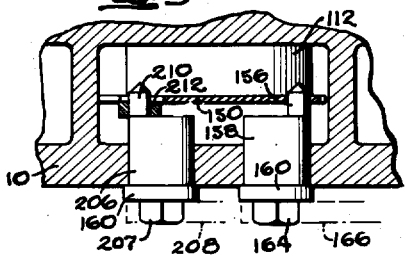
Fig. 9 is a sectional view taken substantially along the line 9—9 of Fig. 7.
Figure 10:
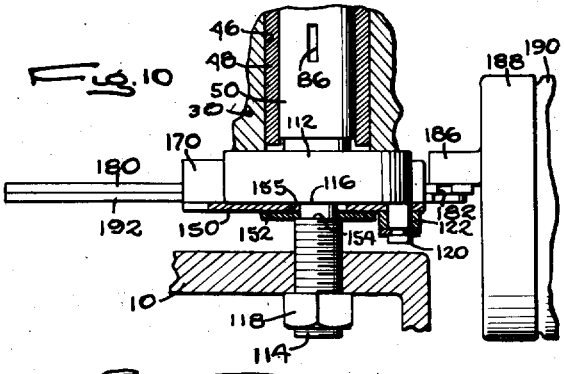
Fig. 10 is a sectional view taken substantially along the line 10—10 of Fig. 7.
Figure 11:
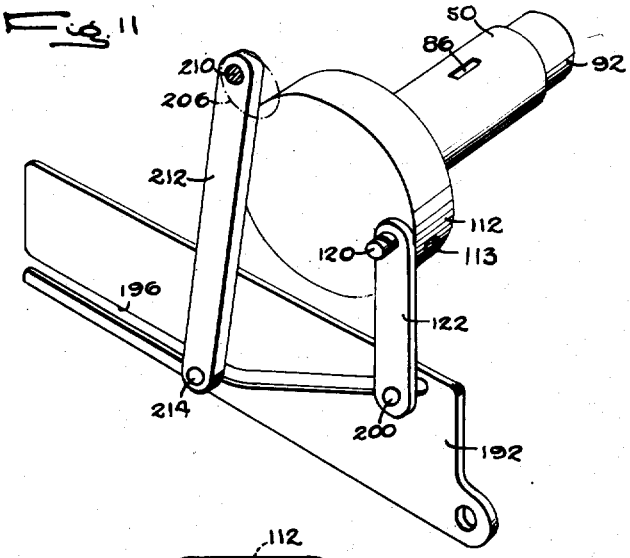
Fig. 11 is an enlarged fragmentary detailed perspective view of a cam and linkage mechanism employed in connection with the diaphragm-operated control unit of Fig. 1.

In actual practice the condition of complete fuel shut-off to the engine is seldom attained or desired inasmuch as the usual idling condition for the engine is ordinarily in effect so that the engine will not stall when pressure on the throttle or accelerator pedal is released. The proper idling condition of the engine may be effected by adjusting the angularity of the operating shaft 206 (Figs. 9 and 11). When the operating shaft 206 is adjusted so that the eccentric pin 210 formed thereon assumes an elevated position, the connecting link 212 will be elevated bodily so that the guide pin 214 at the lower end thereof will become elevated in the restraining slot 216 and, as a consequence, the cam plate 192 will be tilted about its pivotal point of connection 194 throughout a slight degree of angularity. Such tilting movement of the cam plate 192 serves to elevate the so-called "idle portion" represented by the extent 196a of the cam slot 196 so that when the cam assembly 180, 192 is moved towards its extreme right hand position, the cam follower pin 200 will move into this elevated portion 196a of the slot 196. The elevation of this portion of the cam slot 106 may be so adjusted by manipulation of the shaft 206 that the desired adjustment of engine idling will be attained. In such an event the spill passage 86 provided in the metering valve 50 will assume a degree of almost total registry with the spill port 90 in the plunger 48 so that a large amount of fuel is discharged through the spill passage 86, spill port 90 and spill passage 52 at the beginning of the pumping stroke of the plunger 48 with the small remainder of fuel for engine idling purposes being forced outwardly through the discharge ports 66 in the order of firing of the engine cylinders. This adjustment for idling purposes is not to be confused with the normal idling fuel adjustment which is provided by the low end of the cam slope 196, as it moves to the left under the effect of the low manifold pressure or vacuum introduced through the passage 230, 232.

Referring again to the timing diagram of Fig. 19, the spill passage 86 in the metering valve 50 is shown as occupying an angular position wherein a 7½° spill of fuel through the spill passage 52 is attained while a 22½° injection of fuel to the engine takes place. This condition is virtually a full throttle condition of the engine and is a condition that may be encountered during the normal operation of the engine. For idling condition of the engine, the degree of fuel spill might be as high as 95%. According to the diagram of Fig. 19 the spill passage 86 overlaps the spill passage 52 by one-fourth of the entire circumferential extent of this latter passage. It will be understood that the metering valve 50 is positioned for each load, or fuel demand, of the engine, the automatic positioning being a function of the control mechanism with adjustments being provided for tuning the engine or for meeting changing operating conditions.

As previously stated, the movements of the cam plate assembly 180, 192, are effected under the control of the density of air existing in the intake manifold of the internal combustion engine and toward this end the diaphragm control mechanism 42 of Fig. 7 and the piston control mechanism 42 of Fig. 7 and the piston control mechanism 44 of Fig. 15 may be employed. The diaphragm assembly 42 which is housed within the casing section 40 includes the previously mentioned diaphragm 190, together with the attachment plate 188 which is secured to the central regions of the diaphragm. A compression spring 222 is disposed within the casing section 40 and bears at one end against the medial regions of the diaphragm 190 and plate 188, and bears at the other end against a closure member 223 which serves to close one end of the casing 40 and which is secured to the latter by means of studs 224. A retaining plate 226 is held in position by means of anchor screws 228 and serves to anchor one end of the spring 220 in position on the plate 222.

The casing 40 is provided with an inlet opening 230 which communicates with a conduit 232 leading to the intake manifold of the internal combustion engine so that the pressure of air existing within the interior of the casing 40 will be equalized with the pressure existing in the intake manifold.

From the above description it will be seen that when the fuel demand of the engine is relatively low as evidenced by a pressure drop in the intake manifold of the internal combustion engine, this pressure drop will be reflected through the conduit 232 to the interior of the casing section 40 and the diaphragm 190 will be affected so as to cause the plate member 188 secured thereto, to move to the right, against the compression of the spring 222, as viewed in Fig. 7, thus carrying with it the pin 184. Movement of the pin 184 to the right will cause bodily movement of the entire movable cam plate assembly 180, 192 to the right, so that the pin 200 will move downwardly in the cam slot 196 and impart a degree of clockwise motion to the operating collar 112 on the metering valve 50. Such movement of the metering valve 50 will cause the various spill ports 90 to move out of register with the spill passage 86 in the metering valve 50 at a later point in the pump cycle, thereby lengthening the spill period and shortening the discharge period of the cycle. Conversely, when a pressure increase is experienced in the interior of the casing section 40, the diaphragm 190 will be affected so that the pin 184 and cam plate assembly 180, 192 are moved to the left, thus elevating the pin 200 and causing the metering valve 50 to be rotated in a counterclockwise direction. Such rotation of the metering valve will cause the spill ports 90 to move out of register with the spill passage 86 at an earlier point in the pump cycle, thus decreasing the spill period and increasing the discharge period so that more fuel will be supplied to the engine.

In Fig. 15 the control mechanism 38 is shown as being operated under the control of the piston assembly 44 in lieu of the diaphragm assembly 42 employed in connection with the form of the invention shown in Fig. 7. The control mechanism 38 of Fig. 15 remains substantially the same as the control mechanism 38 of Fig. 7 with the exception that the inclined portion of the cam slot 196 is provided with a relatively steep slope 196c in the vicinity of the juncture between the horizontal linear portion 196a.

Whereas in Fig. 7 the linear horizontal portion of 196a of the cam slot 196 is employed for idling adjusting purposes, this portion of the cam slot 196 in Fig. 15 may constitute a complete shut-off point for interrupting the supply of fuel to the internal combustion engine. The sharply inclined sloping portion 196c of the cam slot may be utilized for fuel cut-off purposes. In such an event, the length of the link 212 and the rate of the spring 222 may be designed so that when the pump is adjusted for engine idling purposes, the pin 214 will be disposed within the inclined portion 196c of the slot 196. Thus, if the pressure of air in the intake manifold of the internal combustion engine drops below that ordinarily employed for idling purposes, the cam plate 192 will be moved to an extreme right hand position as viewed in Fig. 15 so that the cam follower pin 200 will ride outwardly in the linear portion 196a of the slot 196 and cause the collar 112 to be rotated in a clockwise direction to a point where 100% spill of fuel as previously described in connection with the timing chart of Fig. 21 takes place. The provision of this type of slot 196 which accommodates a complete shut-off of fuel to the engine is not necessarily limited to use in connection with the piston control assembly 44 as it may well be employed in connection with the diaphragm control assembly 42. In fact, the specific shape of the cam slot may be varied to accommodate the various fuel delivery requirements or preferences for different engines.

In both Figs. 7 and 15 the same characters of reference have been employed for the corresponding parts in the two views to avoid needless repetition of description. The piston assembly 44 includes a piston 240 which fits snugly within the cylindrical interior of the casing section 40 and which is slidable therein. The spring 222 extends into the skirt portion 242 provided on the piston and bears against the piston at one end and at the other against the closure plate 223. The piston is provided with a hub 244 similar to the hub 186 provided on diaphragm of Fig. 10 and the hub 244 carries the transverse pin 184 which projects into the slot 182 provided in the cam plate guide member 180.

The operation of the piston control mechanism 44 is similar to that of the diaphragm control mechanism 42. The position of the piston 240 which is operated upon by the compression spring 242 within the casing section 41 is dependent upon the density of air existing in the intake manifold of the internal combustion engine and movement of the piston to the right or left, as viewed in Fig. 15, will cause elevation or lowering of the cam follower pin and consequent angular adjustment of the metering valve 50.

The invention is not to be limited to the exact arrangement of parts shown in the accompanying drawings or description in this specification as various changes in the details of construction may be resorted to without departing from the spirit of the invention. Only insofar as the invention has been particularly pointed out in the accompanying claims is the same to be limited.

I claim as my invention:

1. In a fuel pump, a casing having a cylindrical bore provided with an inlet passage, an outlet passage, and a spill passage; a hollow cylindrical pumping plunger mounted for rotation and reciprocation within said bore and having an inlet port, an outlet port, and a spill port extending through the wall thereof, a cylindrical metering valve member disposed within said pumping plunger, said valve member and plunger presenting therebetween a variable-volume intake and discharge chamber, there being a spill passage formed in said metering valve member in constant communication with said chamber, said inlet port and inlet passage being arranged for communication during axial movement of the rotating plunger in one direction, said outlet port and outlet passage being arranged for communication during movement of the rotating plunger in the other direction, said spill port being arranged for simultaneous communication with said spill passages during at least a portion of the movement of said piston in said latter direction; and means for rotating and reciprocating said pumping plunger.

2. In a fuel pump, a casing having a cylindrical bore provided with a plurality of inlet passages, a plurality of outlet passages, and a spill passage; a hollow cylindrical pumping plunger mounted for rotation within said bore, said plunger having an inlet port, an outlet port and a plurality of spill ports formed in the wall thereof, said plunger being movable axially in one direction to perform an intake stroke and axially in the other direction to perform a discharge stroke; a cylindrical metering valve member disposed within said pumping plunger, said valve member and plunger presenting therebetween a variable-volume intake and discharge chamber, there being a spill passage formed in said metering valve member in constant communication with said chamber, each of said inlet ports being arranged for communication with one of said inlet passages during movement of the rotating plunger through its intake stroke, said outlet port being arranged for successive movements of the pumping plunger through its discharge stroke, said spill ports being arranged to successively establish communication between said spill passages during at least a portion of said discharge stroke; and means for rotating and reciprocating said pumping plunger.

3. In a fuel pump, a casing having a cylindrical bore provided with a plurality of inlet passages, a plurality of outlet passages, and a spill passage; a hollow cylindrical pumping plunger mounted for rotation within said bore, said plunger being movable axially in one direction to perform an intake stroke and axially in the other direction to perform a discharge stroke, said plunger having a plurality of inlet ports, an outlet port, and a plurality of spill ports extending through the wall thereof, a cylindrical metering valve member rotatably disposed within said pumping plunger and capable of limited angular turning movement about its longitudinal axis, said valve member and plunger presenting therebetween a variable-volume intake and discharge chamber, there being a spill passage formed in said metering valve member in constant communication with said chamber and movable upon turning movement of the valve member into different degrees of register with said first mentioned spill passage, each of said inlet ports being arranged for communication with one of said inlet passages during movement of the rotating plunger through its intake stroke, said outlet port being arranged for successive communication with said outlet passages during successive movements of the pumping plunger through its discharge stroke, said spill ports being arranged to successively establish communication between said registering spill passages during at least a portion of said discharge stroke; means for adjusting the angular position of said metering valve; and means for rotating and reciprocating said pumping plunger.

4. In a fuel pump, a casing having a cylindrical bore provided with a plurality of inlet passages, a plurality of outlet passages arranged in circumferentially spaced relation in a common radial plane, and a spill passage; a hollow cylindrical pumping plunger mounted for rotation within said bore, said plunger being movable axially in one direction to perform an intake stroke and axially in the other direction to perform a discharge stroke, said plunger having a plurality of inlet ports arranged in circumferentially spaced relation in a common radial plane, a cylindrical metering valve member disposed within said pumping plunger, said valve member and plunger presenting therebetween a variable-volume intake and discharge chamber, there being a spill passage extending through said metering valve member in constant communication with said chamber, each of said inlet ports being arranged for communication with one of said inlet passages during movement of the rotating plunger through its intake stroke, said outlet port being arranged for successive movements of the pumping plunger through its discharge stroke, said spill ports being arranged to successively establish communication between said spill passages during at least a portion of said discharge stroke; and means for rotating and reciprocating said pumping plunger.

5. In a fuel pump, a casing having a cylindrical bore provided with an inlet passage, an outlet passage, and a spill passage; a hollow cylindrical pumping plunger mounted for rotation and reciprocation within said bore and having an inlet port, an outlet port and a spill port extending through the wall thereof; a cylindrical metering valve member disposed within said pumping plunger and capable of limited turning movement about its longitudinal axis, said valve member and plunger presenting therebetween a variable-volume intake and discharge chamber, there being a spill passage formed in said metering valve member in constant communication with said chamber and movable upon turning movement of the valve into different degrees of register with said first mentioned spill passage, said inlet port and inlet passage being arranged for communication during axial movement of the rotating plunger in one direction, said outlet port and outlet passage being arranged for communication during movement of the rotating plunger in the other direction, said spill port being arranged to establish communication between said spill passages when the latter are at least partially in register during a portion of the movement of said piston in said latter direction; and means for rotating and reciprocating said pumping plunger.

6. In a fuel pump, a casing having a cylindrical bore provided with an inlet passage, an outlet passage and a spill passage, a hollow cylindrical pumping plunger mounted for rotation and reciprocation within said bore and having an inlet port, an outlet port and a spill port extending through the wall thereof; a cylindrical metering valve member disposed within said pumping plunger, said valve member and plunger presenting therebetween a variable-volume intake and discharge chamber, there being a spill passage formed in said metering valve member in constant communication with said chamber, said inlet port and inlet passage being arranged for communication during axial movement of the rotating plunger in one direction, said outlet port and outlet passage being arranged for communication during movement of the rotating plunger in the other direction, said spill port being arranged for simultaneous communication with said spill passages during at least a portion of the movement of said piston in said latter direction; a cam surface formed on one end of said pumping plunger; an unyielding cam member carried by said casing; means yieldably urging said pumping plunger axially in a direction to bring said cam surface into engagement with said cam member; and means for rotating said pumping plunger.

7. In a fuel pump, a casing having a cylindrical bore provided with a plurality of inlet passages, a plurality of outlet passages, and a spill passage; a hollow cylindrical pumping plunger mounted for rotation within said bore, said plunger being movable axially in the other direction to perform a discharge stroke, said plunger having a plurality of inlet ports, an outlet port, and a plurality of spill ports extending through the wall thereof, a cylindrical metering valve member rotatably disposed within said pumping plunger and capable of limited angular turning movement about its longitudinal axis, said valve member and plunger presenting therebetween a variable-volume intake and discharge chamber, there being a spill passage formed in said metering valve member in constant communication with said chamber and movable upon turning movement of the valve member into different degrees of register with said first mentioned spill passage, each of said inlet ports being arranged for communication with one of said inlet passages during movement of the rotating plunger through its intake stroke, said outlet port being arranged for successive communication with said outlet passage during successive movements of the pumping plunger through its discharge stroke, said spill ports being arranged to successively establish communication between said registering spill passages during at least a portion of said discharge stroke; a pressure responsive device for adjusting the angular position of said valve; and means for rotation and reciprocating said pumping plunger.

8. In a fuel pump, a casing having a cylindrical bore provided with an inlet passage, an outlet passage and a spill passage; a hollow cylindrical pumping plunger mounted for rotation and reciprocation within said bore and having an inlet port, an outlet port and a spill port extending through the wall thereof; means for rotating and reciprocating said pumping plunger; a cylindrical metering valve member rotatably disposed within said pumping plunger and capable of limited turning movement about its longitudinal axis, said valve member and plunger presenting therebetween a variable intake and discharge chamber, there being a spill passage formed in said metering valve member in constant communication with said chamber and movable upon turning of the valve member into different degrees of register with said first mentioned spill passage, said inlet port and inlet passage being arranged for communication during axial movement of the rotating plunger in one direction, said outlet port and outlet passage being arranged for communication during movement of the rotating plunger in the other direction, said spill port being arranged for simultaneous communication with said spill passages during at least a portion of the movement of said piston in said latter direction; an eccentric pin mounted on said valve member; a link pivotally connected at one end to said pin; a cam follower on the other end of said link; a shiftable cam member cooperating with said cam follower and operable upon shifting movements thereof to vary the position of said cam follower and consequently of said metering valve member; and pressure responsive means for shifting the position of said cam member.

9. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and through a discharge stroke to discharge fuel through said outlet, said plunger and said cylinder having respective spill ports, a metering valve member movable in opposite directions to regulate the amount of fuel delivered by said plunger to said discharge outlet, said valve member having means for selectively interconnecting said spill ports, and a control device connected to said metering valve member for moving said valve member and thereby varying the output of said pump.

10. A fuel pump for delivering measured quantities of fuel to an internal combustion engine, comprising a cylinder having a fuel inlet, a fuel outlet and a separate spill port in said cylinder, a pumping plunger movable through a suction stroke to draw fuel into the cylinder through said inlet and movable through a discharge stroke to discharge fuel through said outlet, said plunger having a spill port, and a metering valve member movable in opposite directions to regulate the amount of fuel delivered by said plunger to said discharge outlet, said valve member having means for selectively interconnecting said ports.

11. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and through a discharge stroke to discharge fuel through said outlet, a metering valve member movable in opposite directions to regulate the amount of fuel delivered by said plunger to said discharge outlet, a movable control member, a reciprocable cam plate movable linearly in opposite directions, means operatively connecting said movable control member and cam plate for imparting movements of the former to the latter, there being a cam slot formed in said cam plate, a follower pin loosely disposed in said cam slot, and a link operatively connecting said follower pin and metering valve member for translating the movements of the former to the latter.

12. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and through a discharge stroke to discharge fuel through said outlet, a metering valve member movable in opposite directions to regulate the discharge outlet, a movable control element for adjustig said valve member, a reciprocable guide plate mounted for linear movement in opposite directions, means operatively connecting said guide plate and movable control element for translating the movements of the latter to the former, a cam plate pivotally secured to said guide plate and movable bodily therewith, there being a cam slot formed in said cam plate, a follower pin disposed in said slot, a link operatively connecting said follower pin and metering valve member for translating the movements of the former to the latter, a guide pin disposed in said slot, an operating link connected to said guide pin, and means for adjusting the position of said operating link to vary the position of said cam plate relative to said guide plate.

13. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and through a discharge stroke to discharge fuel through said outlet, a metering valve member movable in opposite directions to regulate the amount of fuel delivered by said plunger to said discharge outlet, a movable control member for varying the output of said pump, a fixed guide channel providing linear guideways, a guide plate slidably disposed in said guideways, means operatively connecting said guide plate and movable bodily therewith, there being a cam slot in said guide plate having a portion inclined with respect to the axis of reciprocation of the guide plate, a follower pin disposed in the inclined portion of said slot, a link operatively connecting said follower and metering valve for changing the position of the latter upon linear movements of the cam plate, a guide pin disposed in said slot extension, an operating link connected to said guide pin, and means for adjusting the position of said operating link to vary the position of said guide pin.

14. In an apparatus for supplying fuel to an internal combustion engine, a fuel injection pump connected to the engine and including an angularly adjustable fuel metering valve movable to vary the fuel supplied to the engine, pressure responsive means for varying the setting of the metering valve comprising a movable pressure responsive member, a guide channel, a reciprocable guide plate slidably disposed in said channel, means connecting said guide plate and movable pressure responsive member for movement in unison, a cam plate pivotally secured adjacent one end to said guide plate and movable bodily with the guide plate, there being a cam slot formed in said cam plate having a longitudinally extending portion and a second portion inclined with respect thereto, a follower pin disposed within the inclined portion of said slot, an operating link connecting said follower pin and metering valve for translating the movements of the follower pin into angular movements of the metering valve, a guide pin disposed in the longitudinally extending portion of said slot, an adjusting link connected to said guide pin, and means for adjusting the position of said adjusting link to vary the position of said guide pin and consequently to vary the angular position of said cam plate relative to said guide plate to thus vary the path of movement of said follower pin.

15. In an apparatus for supplying fuel to an internal combustion engine, a fuel injection pump connected to the engine and including an angularly adjustable fuel metering valve member movable to vary the fuel supplied to the engine, pressure responsive means for varying the setting of said angularly adjustable metering valve comprising a pressure responsive member, a cam plate mounted for linear reciprocable movement in opposite directions, there being a cam slot formed in said cam plate, a follower pin disposed within said slot, an operating link having one end thereof connected to said follower and having the other end thereof pivotally connected to an eccentric point on said metering valve for translating the movements of said cam follower into rotary movement of the metering valve, and means operatively connecting said cam plate and pressure responsive device for translating the movements of the latter to the former.

16. In an apparatus for supplying fuel to an internal combustion engine, a fuel injection pump connected to the engine and including an angularly adjustable metering valve comprising a movable pressure responsive member, a cam plate mounted for linear reciprocation in opposite directions, there being a cam slot formed in said cam plate, a cam follower disposed within said cam slot, means connecting said cam plate and pressure responsive member for movement in unison, and an operating link connecting said cam follower and angularly adjustable metering valve.

17. A fuel injection apparatus for delivering measured quantities of fuel to an internal combustion engine, said apparatus comprising a casing providing a cylinder having a fuel inlet and a fuel outlet, a pumping plunger movable through a suction stroke to draw fuel into the cylinder through said inlet and movable through a discharge stroke to discharge fuel through said outlet, a metering valve member rotatably disposed within said cylinder and capable of angular turning movement in opposite directions to regulate the amount of fuel delivered by said plunger to said discharge outlet, a control device having a movable control member, a guide plate operatively connected to and movable with said movable control member, a cam plate pivoted to said guide plate and movable bodily therewith, there being a cam slot formed in said cam plate and inclined relative to the axis of movement thereof, a cam follower disposed within said slot and capable of lateral displacement upon reciprocation of said cam plate, an opening link having one end thereof connected to said cam follower and having its other end connected to an eccentric point on said metering valve member whereby the displacements of said cam follower will effect turning movement of said metering valve, and means for manually adjusting the inclination of said cam plate relative to said guide plate to vary the displacements of said cam follower upon reciprocation of said cam plate.

18. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and movable through a discharge stroke to discharge fuel through said outlet, said plunger and said cylinder having respective spill ports for spilling fuel during the discharge stroke, an angularly adjustable metering valve member operable when in one angular position of adjustment to maintain a predetermined volume of fuel delivery by said pumping plunger at each discharge stroke thereof and operable when in another angular position of adjustment to maintain a different predetermined volume of fuel delivery by said pumping plunger at each discharge stroke thereof, said valve member having means for selectively interconnecting said ports and pressure responsive means for adjusting the angular position of said metering valve.

19. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and movable through the discharge stroke to discharge fuel through said outlet, an angularly adjustable metering valve member operable when in one angular position of adjustment to maintain a predetermined volume of fuel delivery by said pumping plunger at each discharge stroke thereof and operable when in another angular position of adjustment to maintain a different predetermined volume of fuel delivery by said pumping plunger at each discharge stroke thereof, a movable control member for varying the output of said pump, a cam plate connected and bodily movable with said control member, there being a cam slot formed in said cam plate, a cam follower disposed within said slot of said cam plate by said pressure responsive member, an operating link connecting said cam follower and metering valve member for transmitting motion from the former to the latter to vary the position of the valve member, and means independent of said pressure responsive member for manually adjusting the position of said cam plate relative to the pressure responsive member for varying the displacement of said cam follower.

20. A fuel pump for delivering measured quantities of fuel to an internal combustion engine, comprising a cylinder having a fuel inlet and a fuel outlet, a pumping plunger disposed within said cylinder and movable through a suction stroke to draw fuel into the cylinder through said inlet and movable through a discharge stroke to discharge fuel through said outlet, said plunger having a spill port, an angularly adjustable metering valve member having a port for selectively uncovering said spill port to spill varying amounts of fuel during the discharge stroke according to the position of said valve member, and means for adjusting the angular position of said metering valve member.

*21. In an apparatus for supplying fuel to an internal combustion engine, a fuel injection pump connected to and driven by said engine and comprising an injector casing, an angularly adjustable metering valve structure rotatably supported by the casing and operable to vary the fuel supplied to the engine, an eccentrically mounted pin carried by said metering valve structure, a cam supporting means carried by said casing and substantially overlying said valve structure and having an enlarged opening through which said pin projects, a movably supported pressure responsive control member, and a cam movably mounted on said supporting means and connected to the aforesaid pressure responsive control member, said cam constructed and arranged to actuate said pin and to thereby angularly adjust the metering valve.*

*22. A fuel pump for delivering measured quantities of fuel to an internal combustion engine, comprising a pump cylinder having a fuel inlet and a fuel outlet, a pumping plunger disposed within said cylinder and movable through a suction stroke to draw fuel into the cylinder through said inlet and movable through a discharge stroke to discharge fuel through said outlet, said plunger having a spill port, an angularly adjustable metering valve member having a passage openly communicating at all times with the pump cylinder and terminating in a port for being selectively moved to uncover said spill port to spill varying amounts of fuel during the discharge stroke according to the position of said valve member, a movable control member, and means connecting said control member wtih the metering valve member to angularly adjust said metering valve member in response to movement of said control member.*

*23. In a fuel pump for an internal combustion engine, a casing having a cylindrical bore provided with an inlet passage, an outlet passage and a spill passage; a hollow cylindrical pumping plunger mounted for rotation and reciprocation within said bore and having an inlet port, an outlet port and a spill port extending through the wall thereof, engine driven means for rotating and reciprocating said pumping plunger, a cylindrical metering valve member rotatably disposed within said pumping plunger and capable of limited turning movement about its longitudinal axis, said valve member and plunger presenting therebetween a variable intake and discharge chamber, there being a spill passage formed in said metering valve member in constant communication with said chamber and movable upon turning of the valve member into different degrees of registry with said first mentioned spill passage, said inlet port and inlet passage being arranged for communication during axial movement of the rotating plunger in one direction, said outlet port and outlet passage being arranged for communication during movement of the rotating plunger in the other direction, said spill port being arranged for simultaneous communication with said spill passages during at least a portion of the movement of said piston in said latter direction, an eccentrically mounted pin carried by said valve member, a shiftable cam member means, and means connecting said cam means with said pin for actuating said eccentric pin in response to movement of said cam means, and a movable pressure responsive control member and connections between said pressure responsive control member and the metering valve to thereby angularly adjust said cam means member in response to movement of said pressure responsive control member.*

*24. In an apparatus for supplying liquid fuel to an internal combustion engine, a fuel injection pump connected to the engine and including an adjustable metering valve for varying the fuel supplied to the engine, means for varying the setting of the metering valve comprising a movable control member, a cam plate mounted for longitudinal movement in opposite directions and having a contoured cam edge, a cam follower engaging said cam edge and connected with said metering valve and operable by the longitudinal movement of said cam plate, and means connecting said cam plate and control member to longitudinally move said cam plate and to actuate said cam follower and to thereby adjust the metering valve, and other means for laterally shifting the position of said cam plate to adjust the fuel and air ratio of the fuel and air mixture being supplied to said engine throughout the operating range of said engine operation, said cam plate constrained to be longitudinally moved and laterally shifted in a common plane.*

*25. In an apparatus for supplying fuel to an internal combustion engine, a fuel injection pump connected to and driven by said engine and comprising an injector casing, an angularly adjustable metering valve structure rotatably supported by the casing and operable to vary the fuel supplied to the engine, an eccentrically mounted pin carried by said metering valve structure, a cam supporting means carried by said casing and substantially overlying said valve structure and having an enlarged opening through which said pin projects, a movable control member, and a cam movably mounted on said supporting means and connected to the aforesaid control member, said cam constructed and arranged to actuate said pin and to thereby angularly adjust the metering valve member, and means for adjustably shifting the relative position of said cam with respect to the eccentrically mounted pin carried by said metering valve structure, whereby to selectively adjust the fuel and air ratio of the fuel and air mixture being supplied to said engine throughout the operating range of engine operation.*

*26. In an apparatus for supplying fuel to an internal combustion engine, a fuel injection pump connected to and driven by said engine and comprising an injector casing, an angularly adjustable metering valve structure rotatably supported by the casing and operable to vary the fuel supplied to the engine, an eccentrically mounted pin carried by said metering valve structure, a cam supporting means carried by said casing and substantially overlying said valve structure and having an enlarged opening through which said pin projects, a movable control member, and a cam movably mounted on said supporting means and connected to the aforesaid control member, said cam constructed and arranged to actuate said pin and to thereby angularly adjust the metering valve member, said injector casing providing adjoining noncommunicating chambers, said metering valve structure positioned in one of said chambers and said cam means and associated mechanism positioned in said other chamber.*

*27. A fuel pump for delivering measured quantities of fuel to an internal combustion engine and comprising a pump casing provided with a cylinder having a fuel inlet and a fuel outlet, a pumping plunger disposed within said cylinder and movable through a suction stroke to draw fuel into the cylinder through said inlet and movable through a discharge stroke to discharge fuel through said outlet, an angularly adjustable metering valve member operable when in one angular position of adjustment to maintain a predetermined volume of fuel delivery by said pumping plunger at each discharge stroke thereof and*

*operable when in another angular position of adjustment to maintain a different predetermined volume of fuel delivery by said pumping plunger at each discharge stroke thereof, a control mechanism for varying the output of said pump comprising a cam, a control member connected with said cam and operable to move said cam, said cam movably supported in said casing and overlying said pumping plunger and associated metering valve, a pin carried by said metering valve, said cam constructed and arranged to controllably actuate said pin whereby to adjust said metering valve, and means independent of said control member for adjusting the position of said cam relative to said control member and said pin whereby to vary the controlled displacement of said pin to thereby adjust the fuel and air ratio of the fuel and air mixture supplied to said engine throughout the operating range of engine operation.*

*28. In an apparatus for supplying liquid fuels to an internal combustion engine, a housing, a member mounted for rotation in said housing, said member having a distributing portion and a metering portion, said member having a bore and a pumping member in the bore, said pumping member communicating with said metering portion and said distributing portion, and means for effecting simultaneous rotation and reciprocation of said distributing portion and the relative reciprocation of said pumping member in said bore, said metering portion having a spill passage, and means coacting with said metering portion for controlling the quantity of fuel spilled through said spill passage.*

*29. In an apparatus for supplying liquid fuel to an internal combustion engine, a housing having a bore, a member mounted for rotation and axial movement in said bore, said member having a distributing portion adjacent one end thereof and a metering portion adjacent the opposite end thereof, said member having a bore, a pumping member in said bore and adapted to be relatively reciprocated in said bore upon axial movement of said member and a plurality of outlets adapted to communicate successively with said distributing portion upon its rotation, and a face cam surrounding said member for effecting axial movement thereof upon the rotation of said member, said metering portion having a spill passage, and means for controlling the quantity of fuel spilled therethrough.*

References Cited in the file of this patent or the original patent

UNITED STATES PATENTS

| | | |
|---|---|---|
| 2,147,390 | Vaudet | Feb. 14, 1939 |
| 2,156,933 | Alden | May 2, 1939 |
| 2,210,067 | Cummins | Aug. 6, 1940 |
| 2,361,399 | High | Oct. 31, 1944 |
| 2,378,036 | Reggio | June 12, 1945 |
| 2,405,163 | Parsons | Aug. 6, 1946 |
| 2,413,115 | Sheehan | Dec. 24, 1946 |
| 2,448,347 | Beeh | Aug. 31, 1948 |